US012742426B2

(12) United States Patent
Weinstein

(10) Patent No.: US 12,742,426 B2
(45) Date of Patent: Sep. 22, 2026

(54) SELECTING FUEL FOR USE IN MULTI-FUEL AIRCRAFT POWERPLANT BASED ON OPERATION SETTINGS OF POWERPLANT PERFORMANCE CHARACTERISTICS

(71) Applicant: Pratt & Whitney Canada Corp., Longueuil (CA)

(72) Inventor: Jeffrey Weinstein, Cote St-Luc (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/953,021

(22) Filed: Nov. 19, 2024

(65) Prior Publication Data

US 2026/0139631 A1 May 21, 2026

(51) Int. Cl.
*F02C 9/40* (2006.01)
*B64D 31/04* (2006.01)
*B64D 37/30* (2006.01)

(52) U.S. Cl.
CPC ................ *F02C 9/40* (2013.01); *B64D 31/04* (2013.01); *B64D 37/30* (2013.01); *F05D 2220/323* (2013.01)

(58) Field of Classification Search
CPC ............... F02C 9/40; F02C 9/42; B64D 37/30
See application file for complete search history.

(56) References Cited

U.S. PATENT DOCUMENTS

2023/0015930 A1* 1/2023 Meshkin Fam ........ B64D 37/30
2023/0193835 A1* 6/2023 Swann ...................... F02C 7/22
2023/0324319 A1 10/2023 Bemment

FOREIGN PATENT DOCUMENTS

CN 115688285 A 2/2023
CN 116702380 A 9/2023

OTHER PUBLICATIONS

EP search report for EP 25217099.8 dated Jul. 17, 2026.

* cited by examiner

*Primary Examiner* — Phutthiwat Wongwian
*Assistant Examiner* — Jacek Lisowski
(74) *Attorney, Agent, or Firm* — Getz Balich LLC

(57) ABSTRACT

A method of operation is provided. The operating method includes: operating an aircraft powerplant with a powerplant performance characteristic at a first setting, the operating of the aircraft powerplant including combusting a first fuel in the aircraft powerplant; receiving a command to operate the aircraft powerplant with the powerplant performance characteristic at a second setting; modeling operation of the aircraft powerplant using a first fuel digital twin of the aircraft powerplant, the operation of the aircraft powerplant modeled to determine a first fuel value of a first operational parameter for the aircraft powerplant when operating the aircraft powerplant with the powerplant performance characteristic at the second setting and combusting the first fuel in the aircraft powerplant; and selecting the first fuel or a second fuel for operating the aircraft powerplant with the powerplant performance characteristic at the second setting based on the first fuel value of the first operational parameter.

18 Claims, 4 Drawing Sheets

FIG. 3

SELECTING FUEL FOR USE IN MULTI-FUEL AIRCRAFT POWERPLANT BASED ON OPERATION SETTINGS OF POWERPLANT PERFORMANCE CHARACTERISTICS

TECHNICAL FIELD

This disclosure relates generally to an aircraft and, more particularly, to scheduling fuel use for a multi-fuel powerplant of the aircraft.

BACKGROUND INFORMATION

An aircraft may include a powerplant capable of using multiple types of fuel. Various systems and methods are known in the art for delivering fuel to such a multi-fuel powerplant. While these known fuel delivery systems and methods have various benefits, there is still room in the art for improvement.

SUMMARY

According to an aspect of the present disclosure, a method of operation is provided. The operating method includes: operating an aircraft powerplant with a powerplant performance characteristic at a first setting, the operating of the aircraft powerplant including combusting a first fuel in the aircraft powerplant; receiving a command to operate the aircraft powerplant with the powerplant performance characteristic at a second setting; modeling operation of the aircraft powerplant using a first fuel digital twin of the aircraft powerplant, the operation of the aircraft powerplant modeled to determine a first fuel value of a first operational parameter for the aircraft powerplant when operating the aircraft powerplant with the powerplant performance characteristic at the second setting and combusting the first fuel in the aircraft powerplant; and selecting the first fuel or a second fuel for operating the aircraft powerplant with the powerplant performance characteristic at the second setting based on the first fuel value of the first operational parameter. The second fuel is different than the first fuel.

According to another aspect of the present disclosure, another method of operation is provided. The operating method includes: operating an aircraft powerplant during an aircraft flight with a powerplant performance characteristic at a first setting, the operating of the aircraft powerplant including combusting a first fuel in the aircraft powerplant; receiving a command to operate the aircraft powerplant with the powerplant performance characteristic at a second setting that is different than the first setting; modeling operation of the aircraft powerplant using a first fuel digital twin of the aircraft powerplant, the operation of the aircraft powerplant modeled to determine a first fuel value of a first operational parameter for the aircraft powerplant when operating the aircraft powerplant with the powerplant performance characteristic at the second setting and continuing to combust the first fuel in the aircraft powerplant; and operating the aircraft powerplant during the aircraft flight with the powerplant performance characteristic at second setting. The operating of the aircraft powerplant includes: continuing combustion of the first fuel in the aircraft powerplant where the first fuel value of the first operational parameter is equal to or less than a first parameter threshold; and switching to combustion of a second fuel in the aircraft powerplant where the first fuel value of the first operational parameter is greater than the first parameter threshold.

According to still another aspect of the present disclosure, another method of operation is provided. The operating method includes: operating an aircraft powerplant during an aircraft flight with a powerplant performance characteristic at a first setting, the operating of the aircraft powerplant including combusting a first fuel in the aircraft powerplant; receiving a command to operate the aircraft powerplant with the powerplant performance characteristic at a second setting that is different than the first setting; modeling operation of the aircraft powerplant using a second fuel digital twin of the aircraft powerplant, the operation of the aircraft powerplant modeled to determine a second fuel value of a first operational parameter for the aircraft powerplant when operating the aircraft powerplant with the powerplant performance characteristic at the second setting and combusting a second fuel in the aircraft powerplant; and operating the aircraft powerplant during the aircraft flight with the powerplant performance characteristic at second setting. The operating of the aircraft powerplant includes: continuing combustion of the first fuel in the aircraft powerplant where the second fuel value of the first operational parameter is greater than a first parameter threshold; and switching to combustion of the second fuel in the aircraft powerplant where the second fuel value of the first operational parameter is equal to or less than a first parameter threshold.

The powerplant performance characteristic may be a thrust output of the aircraft powerplant.

The powerplant performance characteristic may be a shaft power output of the aircraft powerplant.

The first setting may be lower than the second setting.

The selecting the first fuel or the second fuel for the operating the aircraft powerplant with the powerplant performance characteristic at the second setting may include: selecting the first fuel where the first fuel value of the first operational parameter is equal to or less than a first parameter threshold; and selecting the second fuel where the first fuel value of the first operational parameter is greater than the first parameter threshold.

The operating method may also include modeling operation of the aircraft powerplant using a second fuel digital twin of the aircraft powerplant, the operation of the aircraft powerplant modeled to determine a second fuel value of the first operational parameter for the aircraft powerplant when operating the aircraft powerplant with the powerplant performance characteristic at the second setting and combusting the second fuel in the aircraft powerplant. The selecting of the first fuel or the second fuel for operating the aircraft powerplant with the powerplant performance characteristic at the second setting may also be based on the second fuel value of the first operational parameter.

The selecting the first fuel or the second fuel for the operating the aircraft powerplant with the powerplant performance characteristic at the second setting may include: selecting the first fuel where the first fuel value of the first operational parameter is equal to or less than a first parameter threshold; and selecting the second fuel where the first fuel value of the first operational parameter is greater than the first parameter threshold and where the second fuel value of the first operational parameter is equal to or less than the first parameter threshold.

The selecting the first fuel or the second fuel for the operating the aircraft powerplant with the powerplant performance characteristic at the second setting may also include selecting a default one of the first fuel or the second fuel where the first fuel value of the first operational parameter is greater than a first parameter threshold and where the second fuel value of the first operational parameter is greater than the first parameter threshold.

The selecting the first fuel or the second fuel for the operating the aircraft powerplant with the powerplant performance characteristic at the second setting may also include selecting a default one of the first fuel or the second fuel where the first fuel value of the first operational parameter is equal to or less than a first parameter threshold and where the second fuel value of the first operational parameter is equal to or less than the first parameter threshold.

The operation of the aircraft powerplant may be modeled to determine a first fuel value of a second operational parameter for the aircraft powerplant when operating the aircraft powerplant with the powerplant performance characteristic at the second setting and combusting the first fuel in the aircraft powerplant. The selecting of the first fuel or the second fuel for operating the aircraft powerplant with the powerplant performance characteristic at the second setting may also be based on the first fuel value of the second operational parameter.

The first operational parameter may be indicative of a temperature within the aircraft powerplant. The second operational parameter may be indicative of a pressure within the aircraft powerplant.

The first operational parameter may be indicative of a temperature or a pressure within the aircraft powerplant.

The first fuel may be a non-hydrocarbon fuel. The second fuel may be a hydrocarbon fuel.

The first fuel may be a hydrocarbon fuel. The second fuel may be a non-hydrocarbon fuel.

One of the first fuel or the second fuel may be hydrogen gas.

The first fuel may be a non-sustainable aviation fuel. The second fuel may be a sustainable aviation fuel.

The first fuel may be a sustainable aviation. The second fuel may be a non-sustainable aviation fuel.

The aircraft powerplant may be configured as an aircraft propulsion system with a ducted propulsor rotor.

The aircraft powerplant may be configured as an aircraft propulsion system with an open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
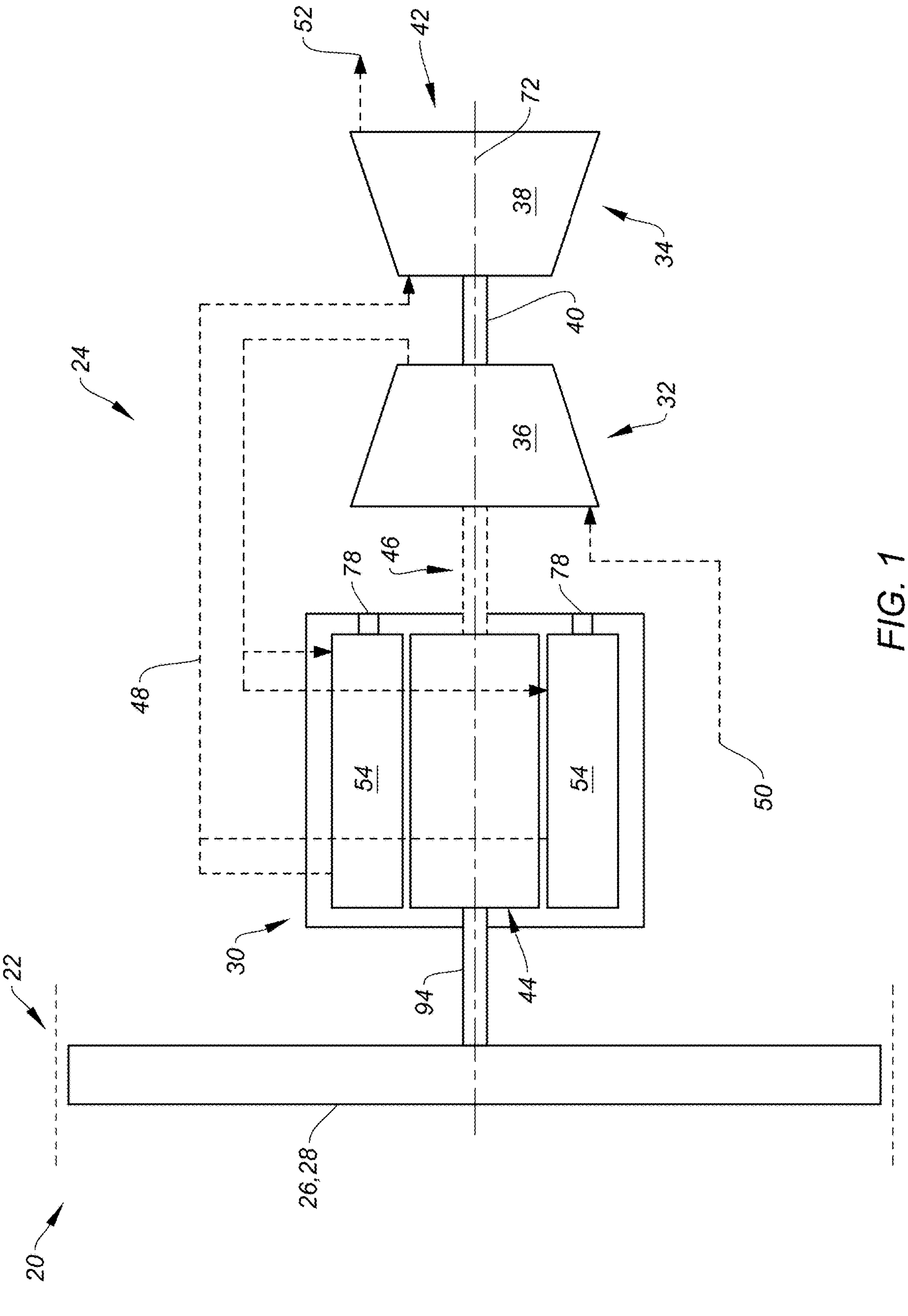
FIG. 1 is a schematic illustration of an aircraft powerplant with an intermittent internal combustion engine.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. The aircraft powerplant 20 may be configured as, or otherwise included as part of, a propulsion system for the aircraft. The aircraft powerplant 20 may also or alternatively be configured as, or otherwise included as part of, an electrical power system for the aircraft.

The aircraft powerplant 20 of FIG. 1 includes a mechanical load 22 powered by an aircraft engine system 24; e.g., an aircraft engine. The mechanical load 22 may be configured as or otherwise include a rotor 26 mechanically driven by the engine system 24. This driven rotor 26 may be a bladed propulsor rotor 28 for the aircraft propulsion system. The propulsor rotor 28 may be an open propulsor rotor (e.g., an un-ducted propulsor rotor) or a ducted propulsor rotor. For example, where the engine system 24 is a propeller engine (e.g., a turbocharged propeller engine, a turbo-compound propeller engine or a turboprop engine), the open propulsor rotor may be a propeller rotor. Where the engine system 24 is a turboshaft engine, the open propulsor rotor may be a rotorcraft rotor such as a helicopter main rotor or a helicopter tail rotor. Where the engine system 24 is a turbofan engine, the ducted propulsor rotor may be a fan rotor. Alternatively, the driven rotor 26 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary engine systems. The engine system 24, for example, may alternatively be configured as a turbojet engine, a propfan engine, a pusher fan engine or any other type of turbine engine operable to power the operation of the mechanical load 22. However, for ease of description, the driven rotor 26 is described below as the propeller rotor.

The engine system 24 may be configured as a turbo-charged or turbo-compound engine. The engine system 24 of FIG. 1, for example, includes an intermittent internal combustion (IC) engine 30, a compressor section 32 (e.g., an engine compressor) and a turbine section 34 (e.g., an engine turbine). The internal combustion engine 30 may be configured as a reciprocating piston engine or a rotary engine. Examples of the reciprocating piston engine include, but are not limited to, a radial engine, an inline (I) engine, a V-engine and a W-engine. A non-limiting example of the rotary engine is a Wankel engine. The compressor section 32 includes a bladed compressor rotor 36. The turbine section 34 includes a bladed turbine rotor 38. This turbine rotor 38 is coupled to and rotatable with the compressor rotor 36. The turbine rotor 38 of FIG. 1, for example, is connected to the compressor rotor 36 through a shaft 40. At least (or only) a combination of the compressor rotor 36, the turbine rotor 38 and the shaft 40 may collectively form a turbo-compressor rotating assembly 42; e.g., a spool. This turbo-compressor rotating assembly 42 may be rotationally discrete from an internal rotating assembly 44 of the internal combustion engine 30. Alternatively, the turbo-compressor rotating assembly 42 may be operatively coupled to and rotatable with the engine rotating assembly 44 through a drivetrain 46 (see dashed line). This drivetrain 46 may be a direct-drive drivetrain or a geared drivetrain.

The aircraft powerplant 20 and its engine system 24 include an internal powerplant flowpath 48. This powerplant flowpath 48 extends from an inlet 50 into the aircraft powerplant 20 and its engine system 24 to a combustion products exhaust 52 from the aircraft powerplant 20 and its engine system 24. More particularly, the powerplant flowpath 48 extends sequentially through the compressor section 32, through one or more combustion zones 54 (e.g., cylinder chambers, etc.) within the internal combustion engine 30, and through the turbine section 34 from the flowpath inlet 50 to the flowpath exhaust 52. With this arrangement, air delivered to the internal combustion engine 30 is compressed by the compressor rotor 36, and combustion products produced by combustion of a mixture of the compressed air and fuel within the combustion zone(s) 54 drives rotation of the engine rotating assembly 44 and the turbine rotor 38. The rotation of the engine rotating assembly 44 drives rotation of the propulsor rotor 28—the driven rotor 26. The rotation of the turbine rotor 38 drives rotation of the compressor rotor 36 to facilitate the compression of the incoming air to the internal combustion engine 30. The rotation of the turbine rotor 38 may also assist driving rotation of the engine rotating assembly 44 where the turbo-compressor rotating assembly 42 is coupled to the engine rotating assembly 44 through the optional direct drive or geared drivetrain 46.

Figure 2:
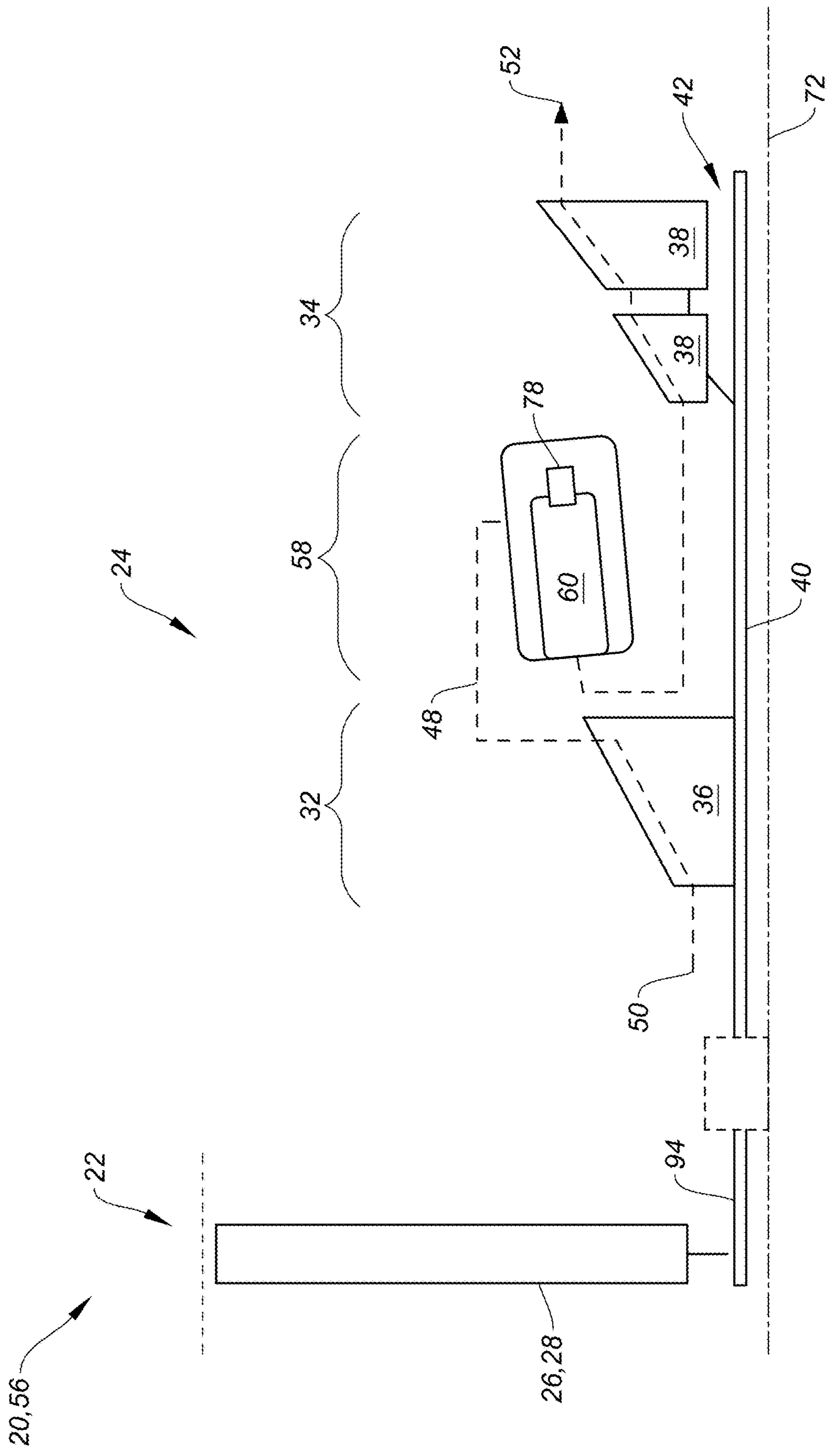
FIG. 2 is a partial schematic illustration of the aircraft powerplant with a gas turbine engine.

While the engine system 24 is described above as including the internal combustion engine 30 fluidly coupled between the compressor section 32 and the turbine section 34, the aircraft powerplant 20 of the present disclosure is not limited to such an exemplary arrangement as described above. For example, referring to FIG. 2, the engine system 24 may alternatively be configured as a gas turbine engine 56 where the internal combustion engine 30 of FIG. 1 is replaced by a combustor section 58 of FIG. 2. With such an arrangement, the powerplant flowpath 48 extends sequentially through the compressor section 32, through a combustion chamber 60 (e.g., an annular combustion chamber) within the combustor section 58, and through the turbine section 34 from the flowpath inlet 50 to the flowpath exhaust 52. For ease of illustration, the turbine engine 56 of FIG. 2 is shown as a single spool turbine engine. It is contemplated, however, the turbine engine 56 may alternatively include two or more spools; e.g., two or more internal rotating assemblies.

Figure 3:
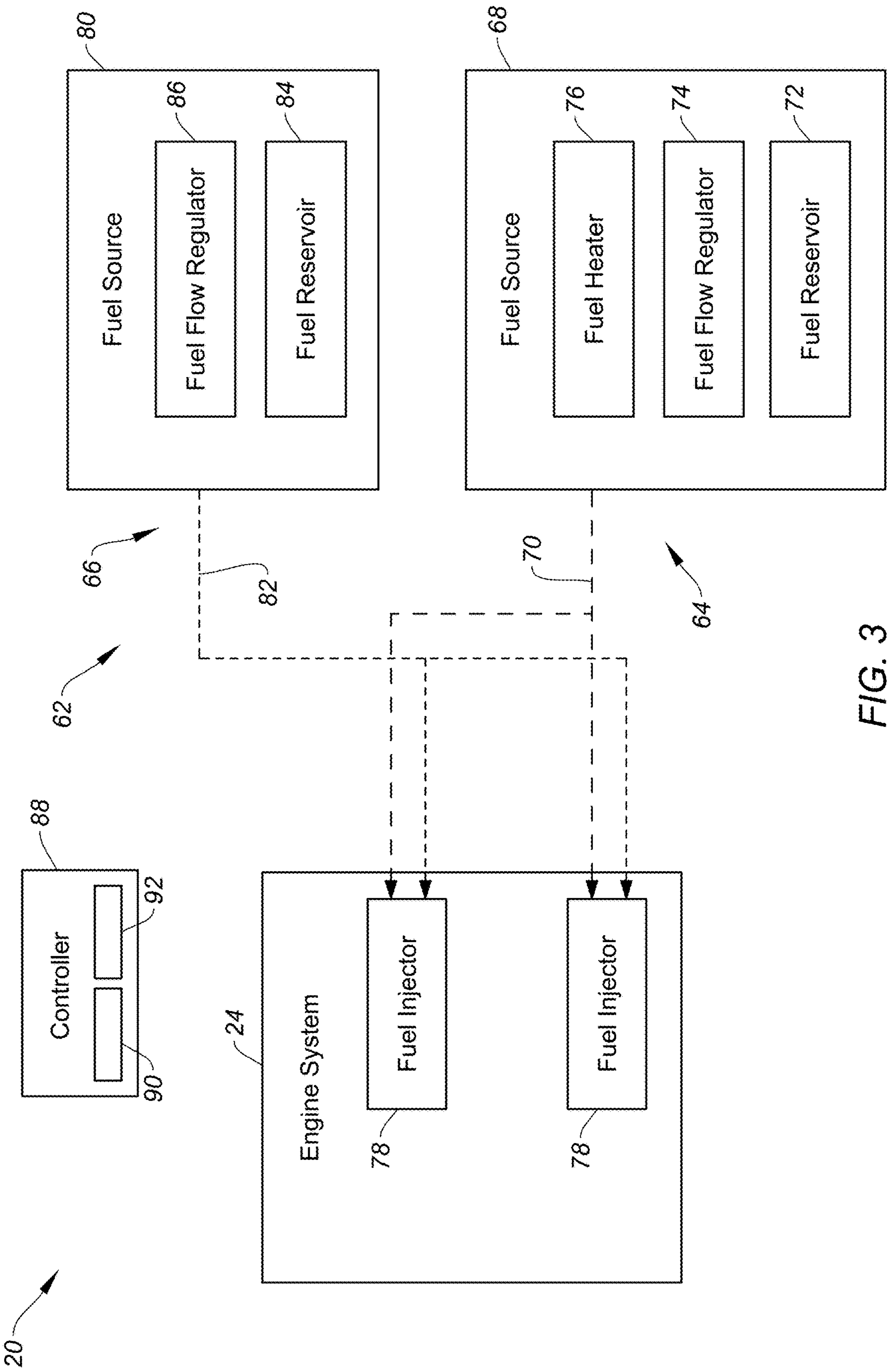
FIG. 3 is a schematic illustration of a fuel system for the aircraft powerplant arranged with an engine system of the aircraft powerplant.

Referring to FIG. 3, the aircraft powerplant 20 includes a multi-fuel powerplant fuel system 62 for delivering the fuel to an internal volume or volumes of the aircraft powerplant 20 for mixing with the compressed air and subsequent combustion. Examples of the internal volume(s) include, but are not limited to, the combustion zone(s) 54 of FIG. 1 and the combustion chamber 60 of FIG. 2. The fuel delivered by the powerplant fuel system 62 of FIG. 3 to the internal volume(s) may be: (a) a first fuel during a first fuel mode of aircraft powerplant operation; (b) a second fuel during a second fuel mode of aircraft powerplant operation; and optionally (c) a combination of the first fuel and the second fuel during a multi-fuel mode of aircraft powerplant operation (e.g., when transitioning from the first fuel operating mode to the second fuel operating mode, or vice versa).

For ease of description, the first fuel is described below as a non-hydrocarbon fuel (NHF) and the second fuel is described below as a hydrocarbon fuel (HF). An example of the non-hydrocarbon fuel is hydrogen ($H_2$) fuel; e.g., liquid hydrogen or hydrogen gas. This hydrogen fuel may (or may not) be a non-hydrocarbon sustainable aviation fuel depending upon its production process. Examples of the hydrocarbon fuel include a kerosene fuel (e.g., a Jet A fuel), a propane fuel, a methane fuel (e.g., a natural gas fuel) and a hydrocarbon sustainable aviation fuel (SAF). Examples of the hydrocarbon sustainable aviation fuel include fuels produced using material(s) such as, but not limited to, corn grain, oil seeds, algae, fats, oils, greases, agricultural residue, forestry residue, wood mill waste, municipal solid waste streams, wet wastes (e.g., manure, wastewater treatment sludge, etc.) and dedicated energy crops. The present disclosure, however, is not limited to the foregoing exemplary non-hydrocarbon and hydrocarbon fuel types. For example, the first fuel may be a hydrocarbon or non-hydrocarbon sustainable aviation fuel, and the second fuel may be a traditional aviation fuel (e.g., a non-sustainable aviation fuel such as the kerosene fuel). In another example, the first fuel and the second fuel may be different types of hydrocarbon fuels (or non-hydrocarbon fuels) and/or hydrocarbon fuel(s) (or non-hydrocarbon fuel(s)) in different phases; e.g., gaseous fuel and liquid fuel.

The powerplant fuel system 62 of FIG. 3 includes a first fuel system 64 (e.g., a non-hydrocarbon fuel system) and a second fuel system 66 (e.g., a hydrocarbon fuel system). The first fuel system 64 includes a first fuel source 68 and a first fuel circuit 70. The first fuel source 68 of FIG. 3 includes a first fuel reservoir 72, a first fuel flow regulator 74 and a first fuel heater 76 (e.g., an evaporator). The first fuel reservoir 72 is configured to store a quantity of the first fuel (e.g., the non-hydrocarbon fuel such as the hydrogen fuel in its liquid phase) before, during and/or after aircraft powerplant operation. The first fuel reservoir 72, for example, may be configured as or otherwise include a tank, a cylinder, a pressure vessel, a bladder or any other type of (e.g., insulated) fuel storage container. The first fuel flow regulator 74 is configured to direct a flow of the first fuel (e.g., the non-hydrocarbon fuel in its liquid phase) from the first fuel reservoir 72, sequentially through the first fuel heater 76 and the first fuel circuit 70, to one or more fuel injectors 78. The first fuel flow regulator 74, for example, may be configured as or otherwise include a fuel compressor, a fuel pump and/or a fuel valve (or valve system). The first fuel heater 76 is configured to facilitate evaporation (or otherwise preheating) of the first fuel (e.g., non-hydrocarbon fuel) from its liquid phase to a gaseous phase such that the gaseous first fuel is directed through the first fuel circuit 70 to the fuel injectors 78. Of course, in other embodiments, the first fuel heater 76 may be omitted where the first fuel is stored within the first fuel reservoir 72 in its gaseous phase and/or where the first fuel system 64 is alternatively configured to deliver the first fuel in its liquid phase to the one or more fuel injectors 78.

The second fuel system 66 includes a second fuel source 80 and a second fuel circuit 82. The second fuel source 80 of FIG. 3 includes a second fuel reservoir 84 and a second fuel flow regulator 86. The second fuel reservoir 84 is configured to store a quantity of the second fuel (e.g., the hydrocarbon fuel) before, during and/or after aircraft powerplant operation. The second fuel reservoir 84, for example, may be configured as or otherwise include a tank, a cylinder, a pressure vessel, a bladder or any other type of fuel storage container. The second fuel flow regulator 86 is configured to direct a flow of the second fuel from the second fuel reservoir 84, through the second fuel circuit 82, to the one or more fuel injectors 78 of the aircraft powerplant 20. The second fuel flow regulator 86, for example, may be configured as or otherwise include a fuel compressor, a fuel pump and/or a fuel valve (or valve system).

For ease of description, the first fuel system 64 and the second fuel system 66 may be described herein as delivering both the first fuel and the second fuel (e.g., concurrently and/or at different times) to a common set of fuel injectors-the fuel injectors 78. The present disclosure, however, is not limited to such an exemplary arrangement. The aircraft powerplant 20, for example, may alternatively include a first set of one or more first fuel-fuel injectors and a second set of one or more second fuel-fuel injectors, where the first fuel-fuel injector(s) receive the first fuel from the first fuel system 64, and where the second fuel-fuel injector(s) receive the second fuel from the second fuel system 66.

The aircraft powerplant 20 of FIG. 3 also include a controller 88 is in signal communication with (e.g., hardwired and/or wirelessly coupled to) the engine system 24 (see FIGS. 1 and 2) and the powerplant fuel system 62. The controller 88, for example, may be in signal communication with one or more actuators of the engine system 24, the first fuel flow regulator 74 and the second fuel flow regulator 86. The controller 88 is configured to signal these (and/or other) elements within the aircraft powerplant 20 to control operation of the aircraft powerplant 20 and, more generally, the engine system 24 and the powerplant fuel system 62. The controller 88, for example, may signal the first fuel flow regulator 74 and/or the second fuel flow regulator 86 such that the powerplant fuel system 62 selectively delivers the first fuel and/or the second fuel to the fuel injectors 78.

The controller 88 may be configured as an onboard powerplant controller (e.g., onboard engine controller) such as an electronic engine controller (EEC), an electronic control unit (ECU), a full-authority digital engine controller (FADEC), etc. Alternatively, the controller 88 may be discrete from, but in signal communication with for example, the onboard powerplant controller.

The controller 88 may be implemented with a combination of hardware and software. The hardware may include memory 90 and at least one processing device 92, which processing device 92 may include one or more single-core and/or multi-core processors. The hardware may also or alternatively include analog and/or digital circuitry other than that described above. The memory 90 is configured to store software (e.g., program instructions) for execution by the processing device 92, which software execution may control and/or facilitate performance of one or more operations such as those described herein. The memory 90 may be a non-transitory computer readable medium. For example, the memory 90 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
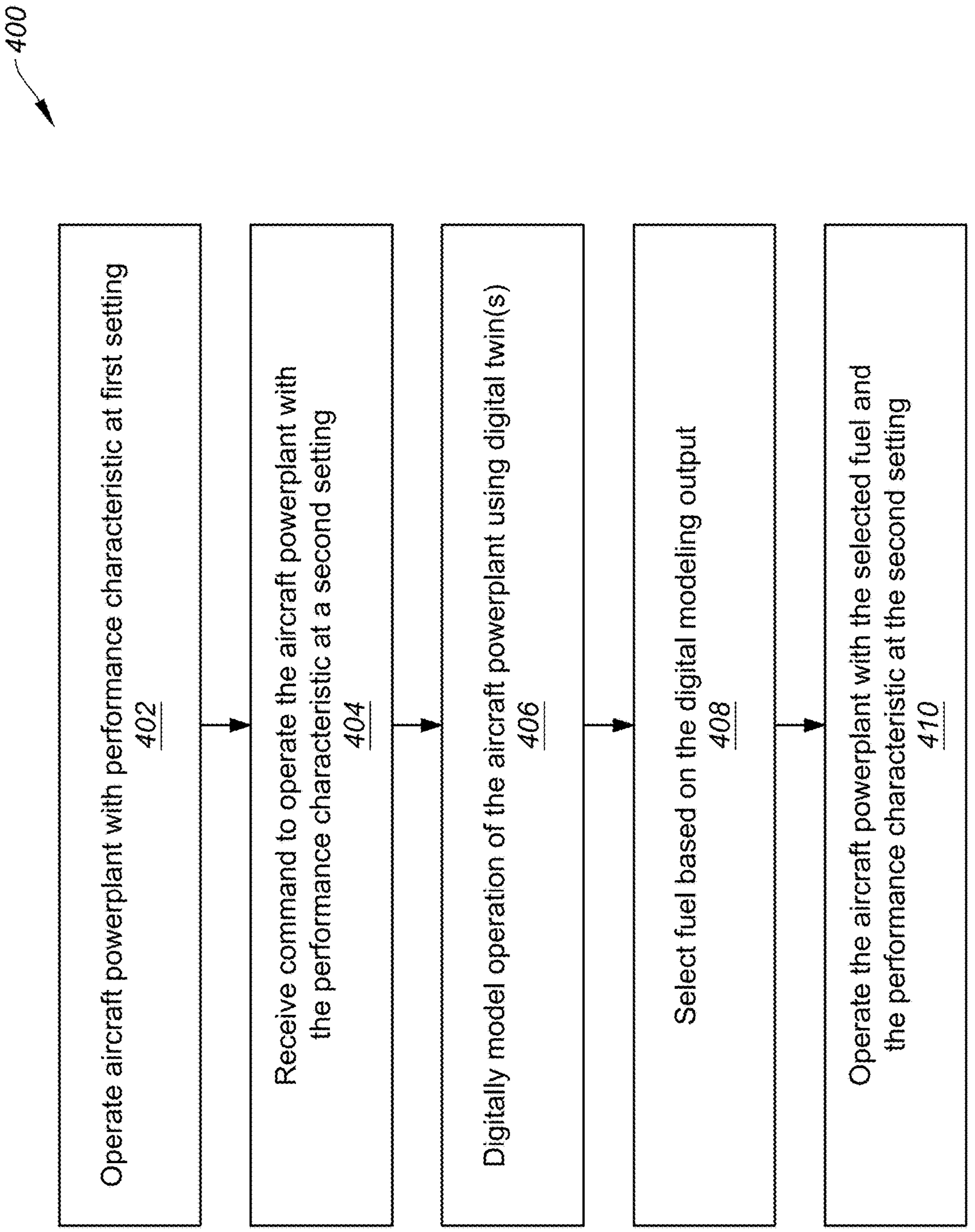
FIG. 4 is a flow diagram of a method for operating the aircraft powerplant.

FIG. 4 is a flow diagram of a method 400 for operating an aircraft. For ease of description, the operating method 400 is described below with reference to the aircraft powerplant 20 described above. The operating method 400 of the present disclosure, however, is not limited to performance with such an exemplary aircraft powerplant. Moreover, for ease of description, the operating method 400 is described below with reference to the first fuel being the non-hydrocarbon fuel and the second fuel being the hydrocarbon fuel. The operating method 400 of the present disclosure, however, is not limited to operating with such exemplary types of first and second fuels. For example, the first fuel may alternatively be the hydrocarbon fuel, and the second fuel may alternatively be the non-hydrocarbon fuel. In another example, the first fuel may be a hydrocarbon or non-hydrocarbon sustainable aviation fuel whereas the second fuel may be a traditional aviation fuel, or vice versa. In still another example, the first fuel and the second fuel may be different types of hydrocarbon fuels (or non-hydrocarbon fuels) and/or hydrocarbon fuel(s) (or non-hydrocarbon fuel(s)) in different phases; e.g., gaseous fuel and liquid fuel.

In step 402, the aircraft powerplant 20 is operated with a powerplant performance characteristic of the aircraft powerplant 20 at a first setting. Examples of the powerplant performance characteristic include, but are not limited to, a thrust output from the aircraft powerplant 20 (e.g., thrust produced by at least (or only) the propulsor rotor 28 of FIG. 1 or 2) and a shaft power output of the aircraft powerplant 20 (e.g., shaft horsepower output via a powerplant output shaft 94 of FIG. 1 or 2). For ease of description, the aircraft powerplant 20 is described as running on the first fuel (e.g., the non-hydrocarbon fuel) during this operating step 402. The powerplant fuel system 62, for example, delivers the first fuel to the engine system 24 for combustion as described above. It is contemplated, however, this operating method 400 may alternatively be performed with running operation of the aircraft powerplant 20 first on the second fuel (e.g., the hydrocarbon fuel).

In step 404, the controller 88 receives a command to operate the aircraft powerplant 20 with its powerplant performance characteristic at a second setting. This command may be received from a pilot through a user interface (e.g., a throttle control), an autopilot controller, or otherwise. This second setting of the powerplant performance characteristic may be greater than or less than the first setting of the powerplant performance characteristic.

In step 406, in response to receiving the command, the controller 88 digitally models operation of the aircraft powerplant 20 using a first fuel digital twin of the aircraft powerplant 20 and/or a second fuel digital twin of the aircraft powerplant 20. For example, the first fuel digital twin digitally models the aircraft powerplant operation while running on the first fuel (e.g., combusting the first fuel within the aircraft powerplant 20) to determine a first fuel value of an operational parameter of the aircraft powerplant 20 with the powerplant performance characteristic at the second setting. The first fuel digital twin is thereby used to predict operational performance of the aircraft powerplant 20 if the powerplant performance characteristic is changed from the first setting to the second setting while still running on the first fuel. Similarly, the second fuel digital twin digitally models the aircraft powerplant operation while now running on the second fuel (e.g., combusting the second fuel within the aircraft powerplant 20) to determine a second fuel value of the operational parameter of the aircraft powerplant 20. The second fuel digital twin is thereby used to predict operational performance of the aircraft powerplant 20 if the powerplant performance characteristic is changed from the first setting to the second setting and fueling of the aircraft powerplant 20 is switched from the first fuel to the second fuel. This modeling using the first fuel digital twin and the second digital twin may be performed simultaneously, overlapping or serially (e.g., directly) one-after-another.

Examples of the aircraft powerplant operational parameter considered by the first fuel digital twin and the second fuel digital twin include a temperature within the aircraft powerplant 20 and a pressure within the aircraft powerplant 20. Examples of the aircraft powerplant temperature include a compressed air temperature, a combustion products temperature, a powerplant component temperature, etc. Examples of the aircraft powerplant temperature include a compressed air pressure, a combustion products pressure, etc. The present disclosure, however, is not limited to the foregoing exemplary aircraft powerplant operational parameters. Moreover, while the modeling step 406 is described above as determining values for a single operational parameter of the aircraft powerplant 20, it is contemplated each digital twin may alternatively determine values for multiple different operational parameters of the aircraft powerplant 20 (e.g., the aircraft powerplant temperature and the aircraft powerplant pressure, multiple aircraft powerplant temperatures, multiple aircraft powerplant pressures, etc.) in other embodiments. In such embodiments, each of the operational parameter values may be processed as described below with respect to the first and the second fuel values for the single operational parameter of the aircraft powerplant 20.

The first fuel digital twin and/or the second fuel digital twin may each be implemented using an onboard model, one or more lookup tables, artificial intelligence (AI) and/or the like. The first fuel digital twin and/or the second fuel digital twin may each be developed based on analytical model(s), test cell data, flight test data, or the like.

To facilitate the aircraft powerplant operational modeling, the first fuel digital twin and/or the second fuel digital twin may each be provided with one or more input parameters. One or more of these input parameters may be measured by one or more sensors (e.g., temperature sensor(s), pressure sensor(s), etc.) and data indicative thereof may subsequently be input into the controller 88. One or more of the input parameters may also or alternatively be estimated or derived by the controller 88 using other operational data about the aircraft powerplant 20. Examples of the input parameters include a temperature within the aircraft powerplant 20, a pressure within the aircraft powerplant 20, ambient temperature outside of the aircraft, ambient pressure outside of the aircraft, and/or aircraft elevation. Examples of the aircraft powerplant temperature include an inlet air temperature, a compressed air temperature, a combustion products temperature, a powerplant component temperature, etc. Examples of the aircraft powerplant temperature include an inlet air pressure, a compressed air pressure, a combustion products pressure, etc. The present disclosure, however, is not limited to the foregoing exemplary input parameters. Moreover, the input parameters may (or may not) include a current (e.g., actual) value for the operational parameter being determined by the first fuel digital twin and/or the second fuel digital twin while the aircraft powerplant 20 is currently operating with the powerplant performance characteristic at the first setting and running on the first fuel.

In step 408, the controller 88 selects a fuel for operating the aircraft powerplant 20 with its powerplant performance characteristic at the second setting. This fuel may be selected by the controller 88 based on the first fuel value of the aircraft powerplant operational parameter and/or the second fuel value of the aircraft powerplant operational parameter. For example, where (a) the first fuel value of the aircraft powerplant operational parameter is equal to or less than an operational parameter threshold and (b) the second fuel value of the aircraft powerplant operational parameter is greater than the operational parameter threshold, the controller 88 may select the first fuel for (e.g., continued) use while operating the aircraft powerplant 20 with its powerplant performance characteristic at the second setting. The operational parameter threshold may be indicative of a maximum design value for the aircraft powerplant operational parameter while operating the aircraft powerplant 20 under, for example, normal (e.g., non-emergency) conditions. Where (a) the first fuel value of the aircraft powerplant operational parameter is greater than the operational parameter threshold and (b) the second fuel value of the aircraft powerplant operational parameter is equal to or less than the operational parameter threshold, the controller 88 may select the second fuel for use while operating the aircraft powerplant 20 with its powerplant performance characteristic at the second setting. Where (a) the first fuel value of the aircraft powerplant operational parameter is equal to or less than the operational parameter threshold and (b) the second fuel value of the aircraft powerplant operational parameter is equal to or less than the operational parameter threshold, the controller 88 may select a first default fuel for use while operating the aircraft powerplant 20 with its powerplant performance characteristic at the second setting. This first default fuel may be: (1) the fuel already being used for aircraft powerplant operation; (2) the fuel associated with a better fuel efficiency (if relevant); (3) the fuel associated with a lower combustion products temperature (if relevant); (4) the fuel associated with a lower combustion products pressure (if relevant); (5) the fuel associated with better emissions (if relevant); and/or (6) the fuel associated with less operational degradation (e.g., internal wear, etc.) of the aircraft powerplant 20 (if relevant). Where (a) the first fuel value of the aircraft powerplant operational parameter is greater than the operational parameter threshold and (b) the second fuel value of the aircraft powerplant operational parameter is greater than the operational parameter threshold, the controller 88 may select a second default fuel for use while operating the aircraft powerplant 20 with its powerplant performance characteristic at the second setting. This second default fuel may be the same as or different than the first default fuel. This second default fuel may be: (1) the fuel already being used for aircraft powerplant operation; (2) the fuel associated with a better fuel efficiency (if relevant); (3) the fuel associated with a lower combustion products temperature (if relevant); (4) the fuel associated with a lower combustion products pressure (if relevant); (5) the fuel associated with better emissions (if relevant); and/or (6) the fuel associated with less operational degradation (e.g., internal wear, etc.) of the aircraft powerplant 20 (if relevant).

In step 410, the aircraft powerplant 20 runs off the selected fuel. For example, where the selected fuel is the first fuel, the controller 88 may signal the powerplant fuel system 62 to continue to deliver the first fuel as (or just before or after) the powerplant performance characteristic is changed from the first setting to the second setting. The aircraft powerplant 20 may thereby continue to run on the first fuel while its powerplant performance characteristic is at the new second setting. In another example, where the fuel is the second fuel, the controller 88 may signal the powerplant fuel system 62 to switch from the delivery of the first fuel to delivery of the second fuel as (or just before or after) the powerplant performance characteristic is changed from the first setting to the second setting. The aircraft powerplant 20 may thereby now run on the second fuel while its powerplant performance characteristic is at the new second setting.

While the operating method 400 is described above as using the first fuel digital twin and/or the second fuel digital twin when a new command is received, the present disclosure is not limited thereto. For example, the operating method 400 may also or alternatively be performed while the setting for the powerplant performance characteristic is maintained uniform; e.g., constant. The controller 88 may thereby monitor aircraft powerplant operation to determine whether continued use of the current fuel still makes sense particularly, for example, when one or more of the input parameters changes (e.g., increases or decreases) over time due to, for example, varying flight conditions, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:

operating an aircraft powerplant with a powerplant performance characteristic at a first setting, the operating of the aircraft powerplant comprising combusting a first fuel in the aircraft powerplant;

receiving a command to operate the aircraft powerplant with the powerplant performance characteristic at a second setting;

modeling operation of the aircraft powerplant using a first fuel digital twin of the aircraft powerplant, the operation of the aircraft powerplant modeled to determine a first fuel value of a first operational parameter for the aircraft powerplant when operating the aircraft powerplant with the powerplant performance characteristic at the second setting and combusting the first fuel in the aircraft powerplant; and selecting the first fuel or a second fuel for operating the aircraft powerplant with the powerplant performance characteristic at the second setting based on the first fuel value of the first operational parameter, wherein the second fuel is different than the first fuel.

2. The method of claim 1, wherein the powerplant performance characteristic is a thrust output of the aircraft powerplant.

3. The method of claim 1, wherein the powerplant performance characteristic is a shaft power output of the aircraft powerplant.

4. The method of claim 1, wherein the first setting is lower than the second setting.

5. The method of claim 1, wherein the selecting the first fuel or the second fuel for the operating the aircraft powerplant with the powerplant performance characteristic at the second setting comprises selecting the first fuel where the first fuel value of the first operational parameter is equal to or less than a first parameter threshold; and selecting the second fuel where the first fuel value of the first operational parameter is greater than the first parameter threshold.

6. The method of claim 1, further comprising:

modeling operation of the aircraft powerplant using a second fuel digital twin of the aircraft powerplant, the operation of the aircraft powerplant modeled to determine a second fuel value of the first operational parameter for the aircraft powerplant when operating the aircraft powerplant with the powerplant performance characteristic at the second setting and combusting the second fuel in the aircraft powerplant;

the selecting of the first fuel or the second fuel for operating the aircraft powerplant with the powerplant performance characteristic at the second setting further based on the second fuel value of the first operational parameter.

7. The method of claim 6, wherein the selecting the first fuel or the second fuel for the operating the aircraft powerplant with the powerplant performance characteristic at the second setting comprises selecting the first fuel where the first fuel value of the first operational parameter is equal to or less than a first parameter threshold; and selecting the second fuel where the first fuel value of the first operational parameter is greater than the first parameter threshold and where the second fuel value of the first operational parameter is equal to or less than the first parameter threshold.

8. The method of claim 6, wherein the selecting the first fuel or the second fuel for the operating the aircraft powerplant with the powerplant performance characteristic at the second setting further comprises selecting a default one of the first fuel or the second fuel where the first fuel value of the first operational parameter is greater than a first parameter threshold and where the second fuel value of the first operational parameter is greater than the first parameter threshold.

9. The method of claim 6, wherein the selecting the first fuel or the second fuel for the operating the aircraft powerplant with the powerplant performance characteristic at the second setting further comprises selecting a default one of the first fuel or the second fuel where the first fuel value of the first operational parameter is equal to or less than a first parameter threshold and where the second fuel value of the first operational parameter is equal to or less than the first parameter threshold.

10. The method of claim 1, wherein the operation of the aircraft powerplant is modeled to determine a first fuel value of a second operational parameter for the aircraft powerplant when operating the aircraft powerplant with the powerplant performance characteristic at the second setting and combusting the first fuel in the aircraft powerplant; and the selecting of the first fuel or the second fuel for operating the aircraft powerplant with the powerplant performance characteristic at the second setting is further based on the first fuel value of the second operational parameter.

11. The method of claim 10, wherein the first operational parameter is indicative of a temperature within the aircraft powerplant, and the second operational parameter is indicative of a pressure within the aircraft powerplant.

12. The method of claim 1, wherein the first operational parameter is indicative of a temperature or a pressure within the aircraft powerplant.

13. The method of claim 1, wherein the first fuel is a non-hydrocarbon fuel, and the second fuel is a hydrocarbon fuel.

14. The method of claim 1, wherein the first fuel is a hydrocarbon fuel, and the second fuel is a non-hydrocarbon fuel.

15. The method of claim 1, wherein the first fuel is a non-sustainable aviation fuel, and the second fuel is a sustainable aviation fuel.

16. The method of claim 1, wherein the first fuel is a sustainable aviation, and the second fuel is a non-sustainable aviation fuel.

17. The method of claim 1, wherein the aircraft powerplant is configured as an aircraft propulsion system with a ducted propulsor rotor.

18. The method of claim 1, wherein the aircraft powerplant is configured as an aircraft propulsion system with an open propulsor rotor.

* * * * *